J. Masters.
Excavator.
No. 76,788.        Patented Apr. 14, 1868.
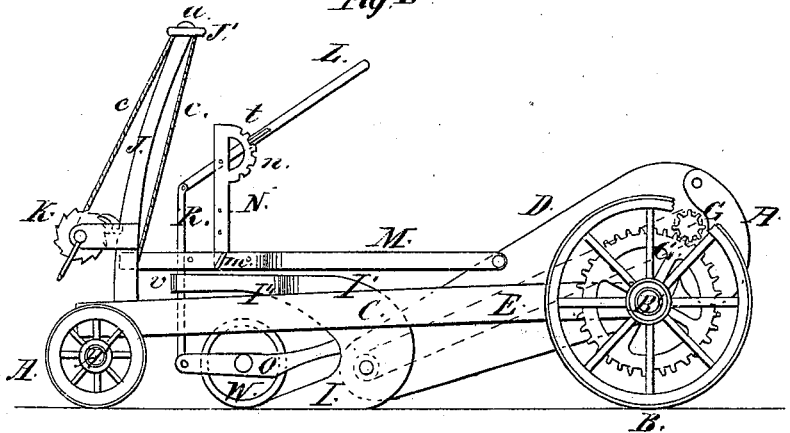
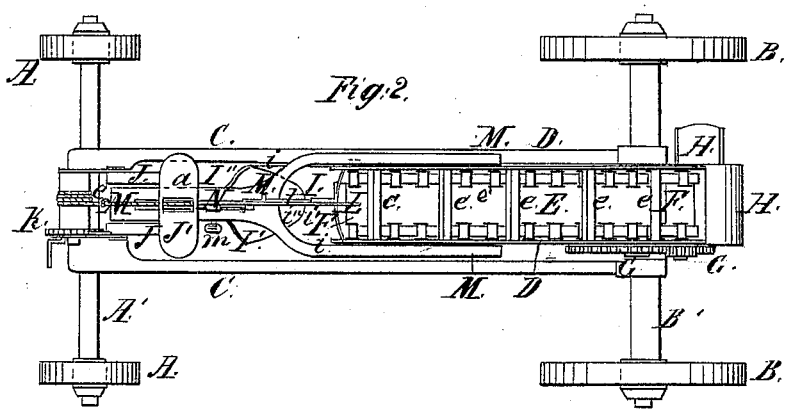
Witnesses:
Inventor:
John Masters
By Munn & Co
Attorneys

United States Patent Office.

JOHN MASTERS, OF WAUKEGAN, ILLINOIS.

Letters Patent No. 76,788, dated April 14, 1868.

IMPROVED DITCHING-MACHINE.

The Schedule referred to in these Letters Patent and making part of the same.

TO ALL WHOM IT MAY CONCERN:

Be it known that I, JOHN MASTERS, of Waukegan, in the county of Lake, and State of Illinois, have invented a new and improved Drain-Plough; and I do hereby declare the following to be a full, clear, and exact description of the same, sufficient to enable those skilled in the art to which my invention appertains to make use of it, reference being had to the accompanying drawings, forming part of this specification, in which—

Figure 1 is a side elevation, and

Figure 2, a top view of my invention.

This invention combines with a new form of plough, a new device for adjusting it, and a new arrangement of the wheel, by which the working of the elevator is improved.

In the drawings, A represents the forward and B the rear wheels, A' and B' being the corresponding axles. The axles are connected by an iron coupling-frame, C, the forward end of which rests upon the fore axle, and is attached to it by the king-bolt.

D is the elevator-box, containing the elevator E, an endless apron, constructed by connecting a series of angle-iron plates, e e, together by two endless chains, e' e', as shown in fig. 2. The apron thus formed is carried upon two rollers, F F, one of which receives motion from the rear axle through the medium of gear-wheels G G. The dirt carried back upon the apron is discharged through a pivoted chute, H.

I represents the plough, which is pivoted to the forward end of the elevator-box upon the journals of the roller-shaft F. The plough is of peculiar construction, being formed with two land-sides, i i, terminating in front in sharp steel points, and between them a concave double mould-board, i', the front or cutting-edge of which is curved, as shown at i'' in fig. 2. Stout curved arms, I' I', extend upward and forward from the land-sides till they meet at I'', where they unite and form a single arm, which projects forward still further, terminating at v. The arm I'' thus formed is for the purpose of regulating the plough, as will be hereafter explained.

From the forward end of the coupling-frame C, rise two slightly-curved standards J J, surmounted by a cross-bar, J', containing a truck, a. A strong forked and slotted beam, M, is firmly fixed at its rear end to the sides of the elevator-box, terminating at its front end between the standards J J. A cord, c, passes from this end of the beam over the truck a, and down to a roller, K, provided with a crank, ratchet, and pawl, which serve to wind up or unwind the cord, and thus to raise or depress the forward end of the elevator-box and the plough I.

From the arm I'', a vertical standard, N, rises, passing through a slot in the beam M, and terminating, at its upper end, in a segmental rack, n. This standard can be raised or depressed at pleasure, and fixed at any degree of elevation by means of a pin, m, operating in a series of holes in the standard, as seen in fig. 1. As it rises and falls, it carries the arm I'' with it, raising or depressing the point of the plough. By this means the plough can be always kept in a horizontal position, however inclined the elevator may be, and however deep in the ground the plough may be operating.

A hand-lever, L, provided with a snap-trigger, t, which operates in the rack n, is pivoted to the upper end of the standard N. A connecting-rod, R, extends from the forward end of this lever down to a horizontal frame, O, which is pivoted to the land-sides of the plough, and extends a few feet in front of the plough. The roller-wheel W has its bearings in the pivoted frame, and is adjusted so as to come in contact with the ground nearly between the plough-points. By adjusting the wheel thus near to the plough, the sod and dirt are confined to the plough, and forced back upon the elevator. The wheel can be fixed at any elevation by means of the hand-lever L, which raises or depresses the forward end of the frame in which it bears.

A drain-plough thus constructed, operates with great efficiency, cutting the drain rapidly, and carrying off the dirt perfectly as it moves along. The device above described for regulating the position of the plough so as to keep it always horizontal, is of great utility, causing the machine to work much more easily in deep ditching than the other machines hitherto in use. The advantage of arranging the wheel W at the plough-point has been already referred to. It is found in practice that this arrangement prevents the dirt from clogging the plough, forcing it back upon the mould-board, and discharging it upon the elevator in the most perfect manner.

Having thus described my invention, what I claim as new, and desire to secure by Letters Patent, is—

1. I claim the pivoted plough I, when constructed and arranged so as to be adjustable in a horizontal position upon the elevator-box D, at whatever depth in the ground it may be operating, in combination with the elevator-box D, as herein described.

2. I claim the plough I, when constructed with two land-sides $i\ i$, the concave double mould-board $i'$, the curved cutting-edge $i''$, and the arms $I'\ I''$, substantially as and for the purpose specified.

3. I claim the wheel W, rendered adjustible in the manner herein described, when arranged so as to operate in combination with and at the plough-point, substantially as and for the purpose specified.

JOHN MASTERS.

Witnesses:
  O. RECTOR,
  SAML. A. LOW.